US012698992B2

(12) United States Patent
Wiest et al.

(10) Patent No.: US 12,698,992 B2
(45) Date of Patent: Aug. 4, 2026

(54) ARRANGEMENT OF ULTRASONIC TRANSDUCERS, CLAMP-ON ULTRASONIC MEASURING DEVICES HAVING AN ARRANGEMENT OF THIS TYPE, AND METHOD FOR ADJUSTING THE ULTRASONIC MEASURING DEVICE

(71) Applicant: Endress+Hauser Flowtec AG, Reinach (CH)

(72) Inventors: Achim Wiest, Weil am Rhein (DE); Michal Bezdek, Aesch (CH); Frank Wandeler, Remigen (CH)

(73) Assignee: Endress+Hauser Flowtec AG, Reinach (CH)

( * ) Notice: Subject to any disclaimer, the term of this patent is extended or adjusted under 35 U.S.C. 154(b) by 273 days.

(21) Appl. No.: 18/567,447

(22) PCT Filed: May 18, 2022

(86) PCT No.: PCT/EP2022/063476
    § 371 (c)(1),
    (2) Date: Dec. 6, 2023

(87) PCT Pub. No.: WO2022/263088
    PCT Pub. Date: Dec. 22, 2022

(65) Prior Publication Data
    US 2024/0288292 A1    Aug. 29, 2024

(30) Foreign Application Priority Data
    Jun. 16, 2021    (DE) ..................... 10 2021 115 546.0

(51) Int. Cl.
    *G01F 1/66* (2022.01)
    *G01F 1/667* (2022.01)

(52) U.S. Cl.
    CPC .............. *G01F 1/662* (2013.01); *G01F 1/667* (2013.01)

(58) Field of Classification Search
    CPC ................................. G01F 1/662; G01F 1/667
    See application file for complete search history.

(56) References Cited

U.S. PATENT DOCUMENTS 4,882,934 A    11/1989 Leffert et al.
5,546,813 A     8/1996 Hastings et al.
            (Continued)

FOREIGN PATENT DOCUMENTS

CN        102288781 A1    12/2011
CN        103147747 A1     6/2013
            (Continued)

*Primary Examiner* — Thomas M Hammond, III
(74) *Attorney, Agent, or Firm* — Christopher R. Powers; Endress+Hauser (USA) Holding, Inc.

(57) ABSTRACT

An arrangement of ultrasonic transducers of a clamp-on ultrasonic measuring device includes at least one pair of ultrasonic transducers, which include: in a measurement arrangement, an axial arrangement distance relative to a measurement tube axis; an emitting transducer apparatus designed to generate an ultrasonic signal field, which has, in the coupling body, a first longitudinal axis parallel to a transducer longitudinal axis; the ultrasonic signal field has an opening angle in the medium; the first longitudinal axis defines a reference signal path; the reference signal path defines an axial reference distance of a reference arrangement relative to centroids of the ultrasonic transducers; the axial arrangement distance is determined by the centroids; the arrangement distance is less than the reference distance; and a target difference between the reference distance and the arrangement distance is dependent on at least the opening angle of the ultrasonic signal field in the medium.

13 Claims, 2 Drawing Sheets

(56)  References Cited

U.S. PATENT DOCUMENTS

| | | | |
|---|---|---|---|
| 2007/0151362 A1 | 7/2007 | Mori et al. | |
| 2015/0355002 A1* | 12/2015 | Sasaki | G01F 1/667 |
| | | | 73/861.28 |
| 2017/0307427 A1* | 10/2017 | Funck | G01F 1/667 |
| 2019/0154483 A1* | 5/2019 | Hoheisel | G01F 1/667 |
| 2021/0080302 A1* | 3/2021 | Davey | G01F 1/667 |

FOREIGN PATENT DOCUMENTS

| | | | |
|---|---|---|---|
| CN | 103424152 A1 | 12/2013 | |
| CN | 211086201 U1 | 7/2020 | |
| DE | 10312034 B3 | 3/2004 | |
| DE | 10254053 A1 | 6/2004 | |
| DE | 102004028215 A1 | 12/2005 | |
| DE | 102018132053 A1 | 6/2020 | |
| EP | 2154491 A1 | 2/2010 | |

* cited by examiner

ARRANGEMENT OF ULTRASONIC TRANSDUCERS, CLAMP-ON ULTRASONIC MEASURING DEVICES HAVING AN ARRANGEMENT OF THIS TYPE, AND METHOD FOR ADJUSTING THE ULTRASONIC MEASURING DEVICE

CROSS-REFERENCE TO RELATED APPLICATIONS

The present application is related to and claims the priority benefit of German Patent Application No. 10 2021 115 546.0, filed Jun. 16, 2021, and International Patent Application No. PCT/EP2022/063476, filed May 18, 2022, the entire contents of which are incorporated herein by reference.

TECHNICAL FIELD

The invention relates to an arrangement of ultrasonic transducers, a clamp-on ultrasonic measuring device for measuring a measured variable of a medium located in a measurement tube having such an arrangement, and to a method for adjusting the ultrasonic measuring device.

BACKGROUND

Ultrasonic transducers of clamp-on ultrasonic measuring devices are used to transmit and receive ultrasonic signals to be able to draw conclusions about a property of a medium in a measurement tube, for example, from a signal propagation time of the ultrasonic signals or a propagation time difference between two ultrasonic signals propagating in opposite directions; see for example DE10254053A1.

A problem with typical clamp-on ultrasonic measuring devices is that ultrasonic signals cause signal reflections at different interfaces, which reflections also arrive at a receiving ultrasonic transducer and overlap the actual measuring signal.

SUMMARY

The object of the invention is therefore to minimize the influence of such interfering signal reflections.

The object is achieved by an arrangement, by a clamp-on ultrasonic measuring device, and by a method according to the present disclosure.

An arrangement according to the invention of ultrasonic transducers of a clamp-on ultrasonic measuring device for measuring a measurand of a medium flowing through a measurement tube, wherein the ultrasonic transducers are arranged on the measurement tube, comprises:

at least one pair of ultrasonic transducers arranged on the measurement tube for, in particular, alternately transmitting and receiving ultrasonic signals, wherein the ultrasonic transducers have, in a measurement arrangement, an axial arrangement distance from one another with respect to a measurement tube axis, wherein the ultrasonic transducers each have a transducer apparatus having a transducer longitudinal axis for generating and detecting ultrasonic signals and a coupling body for transmitting the ultrasonic signals between the transducer apparatus and the measurement tube, wherein the transducer apparatuses are each acoustically and mechanically connected to an associated coupling body via a transducer-side coupling surface of the coupling body, wherein the transducer apparatuses each have a side facing the associated coupling element and having a contact surface region, wherein the contact surface regions each have a surface region centroid, wherein an emitting transducer apparatus is designed to generate an ultrasonic signal field, which ultrasonic signal field has, in the coupling body, a first longitudinal axis in particular parallel to the transducer longitudinal axis, wherein the ultrasonic signal field has an opening angle in the medium in a measurement tube longitudinal section plane through the surface region centroids, wherein the first longitudinal axis defines a reference signal path with a reference arrangement for the ultrasonic transducers and is part of this reference signal path and has a longitudinal axis angle to a normal of a measurement tube wall, wherein the reference signal path defines an axial reference distance between the surface region centroids with respect to the reference arrangement, wherein in the measurement arrangement, a measurement path runs between the surface region centroids, wherein the axial arrangement distance is determined by the surface region centroids, wherein the coupling bodies are each acoustically and mechanically connected to the measurement tube via a coupling surface, wherein the arrangement distance is less than the reference distance, and a target difference between the reference distance and the arrangement distance is dependent on at least the following feature:

opening angle of the ultrasonic signal field in the medium.

The opening angle can, for example, be calculated or specified by a formula in which, for example, a wavelength of the ultrasonic signal in the medium and a side length of the transducer element are used. The person skilled in the art can also use other or further measurands for this purpose.

However, the opening angle can also be determined by calibration measurements, for example.

It has been shown that a measurement arrangement having an arrangement distance less than the reference distance reduces interfering influences, for example, due to signal reflections, and thus simplifies signal evaluation.

A contact surface region can, for example, simply be a contact surface, such as in a one-piece piezoelectric element. The contact surface can, for example, be shaped like a circle or a regular polygon, for example, but is not limited thereto. However, the contact surface region can also be spanned by several non-contiguous contact surfaces. The surface region centroid can also lie outside of a contact surface.

The transducer apparatus can, for example, be disk-shaped. However, it can also be block-shaped, for example. The transducer apparatus can be a single piece or composed of several components.

In one embodiment, the opening angle in the medium is defined by an amplitude drop of 20 decibels relative to a maximum amplitude, wherein the reference path in the medium has a first angle to the normal of the measurement tube wall, wherein the measurement path in the medium has a second angle to the normal of the measurement tube wall, wherein a magnitude of the second angle is smaller than the first angle, wherein an angle difference is the opening angle multiplied by a factor F, wherein F is at most 1.5 and in particular at most 1.2 and preferably at most 1.

It has been shown that in this way a receiving ultrasonic transducer receives a sufficiently good ultrasonic signal in an edge region of the ultrasonic signal field and benefits from a minimization of interference.

In one embodiment, the target difference is at least 1 millimeter and in particular at least 2 millimeters and preferably at least 3 millimeters. In this way, it is ensured that the invention has a minimum effect.

In one embodiment, the opening angle of the ultrasonic signal field is less than 2 times the first angle.

In one embodiment, an ultrasonic signal causes echo paths in the measurement tube wall which have a common end point with the reference signal path, wherein a receiving ultrasonic transducer in the measurement arrangement suppresses at least one first echo path on a side of the measurement tube facing the receiving ultrasonic transducer and having two reflections in the measurement tube wall and in particular at least one second echo path having four reflections in the measurement tube wall.

In this way, substantial interference is suppressed and measurement properties of the measurement arrangement are improved. Suppressing an echo path does not preclude edge regions of echo signals from being picked up by a receiving ultrasonic transducer. The term "echo path" refers to a central region, with maximum echo amplitude, of an echo signal.

In one embodiment, the transducer apparatus has at least one piezoelectric element.

In one embodiment, the opening angle in the medium is calculable by the following formula:

$$\ddot{O} = \arcsin(0.87 * W/S)$$

where W is the wavelength of a central frequency of the ultrasonic signal in the medium and S is the side length of the transducer apparatus in a longitudinal sectional plane of the measurement tube.

A clamp-on ultrasound measuring device according to the invention for measuring a measurand of a medium located in a measurement tube comprises:

an arrangement according to any one of the preceding claims, and an electronic measuring/operating circuit for operating the ultrasonic transducers and for providing and outputting measured values of the measurand.

In a method according to the invention for adjusting an ultrasonic measuring device according to the invention, in a first method step at least the following variables are used to determine the reference signal path or reference distance:

respectively at least one sound velocity of coupling body, measurement tube wall, medium, angle between first longitudinal axis and a normal to the measurement tube wall, a thickness of a measurement tube wall, a diameter of the measurement tube, number of ultrasonic signal traverses in the measurement tube, wherein in a second method step, at least one of the following variables is used to determine the target difference:

opening angle in the medium, wherein in a third method step, the ultrasonic transducers of a pair are arranged on the measurement tube according to the results of the first method step and the second method step.

In one embodiment, the electronic measuring/operating circuit performs the first method step and the second method step and provides information to an operator in order to perform the third method step.

In one embodiment, the operator provides information to the electronic measuring/operating circuit in order to perform the first method step.

The invention will now be described with reference to exemplary embodiments.

DETAILED DESCRIPTION

Figure 1:
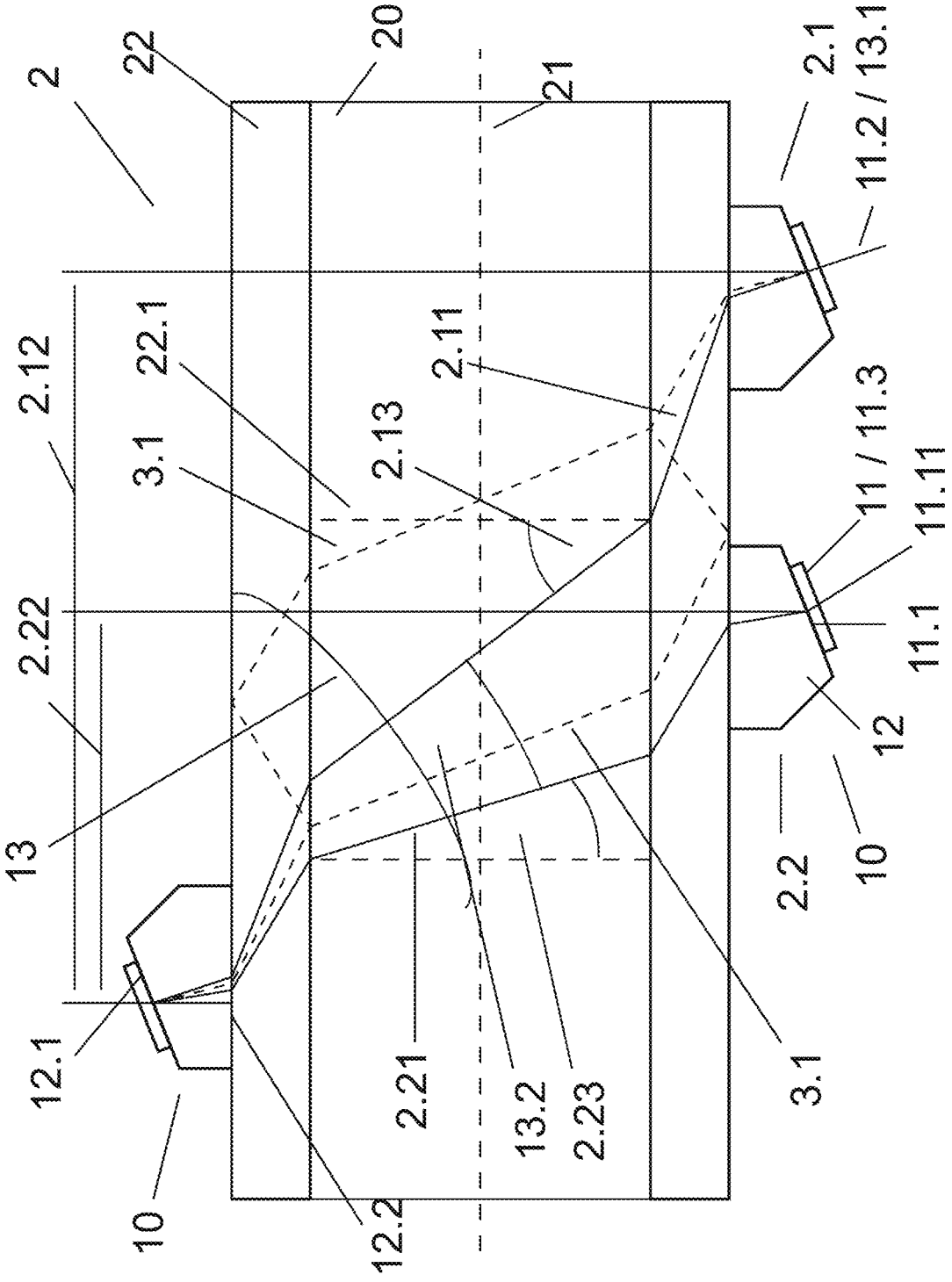
FIG. 1 illustrates exemplary arrangements of an ultrasonic transducer pair on a measurement tube.

FIG. 1 illustrates the structure and operation of two arrangements 2 of a pair of exemplary clamp-on ultrasonic transducers 10, which are arranged on an outer side of a measurement tube 20. The ultrasonic transducers each have a disk-shaped transducer apparatus 11 and a coupling body 12, wherein the transducer apparatus is acoustically and mechanically connected via a contact surface region 11.1 to a transducer-side coupling surface 12.1 of the coupling body. The contact surface regions each have a surface region centroid 11.11.

A contact surface region can, for example, simply be a contact surface, such as in a one-piece piezoelectric element. The contact surface can, for example, be shaped like a circle or a regular polygon, for example, but is not limited thereto. However, the contact surface region can also be spanned by several non-contiguous contact surfaces. The surface region centroid can also lie outside of a contact surface.

The transducer apparatus can also be block-shaped, for example. The transducer apparatus can be a single piece or composed of several components.

A first arrangement corresponds to a reference arrangement 2.1, and a second arrangement corresponds to a measurement arrangement 2.2 according to the invention. In this case, the reference arrangement corresponds to an arrangement according to the prior art, wherein a receiving ultrasonic transducer picks up an ultrasonic signal along a reference signal path 2.11. The reference signal path is characterized in that it runs along a first longitudinal axis of an ultrasonic signal field in the coupling body, i.e., along a region of maximum ultrasonic signal amplitude. Typically, the first longitudinal axis 13.1 runs along a transducer longitudinal axis 11.2 starting from the surface region centroid 11.11, as illustrated.

In this case, the reference arrangement has an axial reference distance 2.12, which is dimensioned parallel to a measurement tube axis 21 between the surface region centroids 11.11 of the contact surfaces of the transducer apparatuses of the ultrasonic transducers. Accordingly, a measurement arrangement has an axial arrangement distance 2.22.

A problem with the reference arrangement is, for example, that not only the ultrasound signal itself but also reflections of the ultrasound signal reach a receiving ultrasonic transducer at different interfaces via echo paths and thus overlap the ultrasound signal in an interfering manner.

Echo paths are illustrated by way of example by the dashed lines, in which two reflections occur at measurement tube interfaces in a measurement tube wall 22 of the measurement tube. There are also further echo paths with more than two reflections.

According to the invention, the axial arrangement distance 2.22 is smaller in magnitude than the reference distance 2.12, wherein a target difference between the reference distance and arrangement distance is dependent on at least the following feature:

opening angle of the ultrasonic signal field in the medium.

In this way, the influence of interference such as reflected ultrasonic signals can be reduced via echo paths. The relevance of echo paths with respect to their interference character increases as the opening angle of the ultrasonic signal field increases. The opening angle of the ultrasonic signal field in the medium is a simple variable because the ultrasonic signal field is substantially defined by a far-field character in the medium. As a measure for the opening angle, for example, a formula can be used in which, for example, a wavelength of the ultrasonic signal in the medium and a side length of the transducer element are used. The person skilled in the art can also use other or further measurands for this purpose. However, the opening angle can also be determined by calibration measurements, for example.

In one embodiment, the opening angle 13.2 in the medium is defined by an amplitude drop of 20 decibels relative to a maximum amplitude, wherein the reference signal path 2.11 in the medium has a first angle 2.13 to the normal of the measurement tube wall, wherein the measurement path 2.21 in the medium has a second angle 2.23 to the normal of the measurement tube wall, wherein a magnitude of the second angle is smaller than the first angle, wherein an angle difference between the first angle and the second angle is the opening angle multiplied by a factor F, wherein F is at most 1.5 and in particular at most 1.2 and preferably at most 1. It has been shown that in this way a receiving ultrasonic transducer receives a sufficiently strong ultrasonic signal in an edge region of the ultrasonic signal field and benefits from a minimization of interference.

In one embodiment, the target difference is at least 1 millimeter and in particular at least 2 millimeters and preferably at least 3 millimeters. This ensures that the effect according to the invention has a minimum effect.

In one embodiment, as illustrated in FIG. 1, a receiving ultrasonic transducer in the measurement arrangement suppresses at least one first echo path 3.1 on a side of the measurement tube facing the receiving ultrasonic transducer and having two reflections in the measurement tube wall and in particular at least one second echo path having four reflections in the measurement tube wall. In this way, substantial interference is suppressed and measurement properties of the measurement arrangement are improved.

The transducer apparatus 11 can have, for example, at least one piezoelectric element 11.3.

The opening angle 13.2 in the medium can be calculated or measured by the following formula: opening angle=arcsin (0.87*W/S), where W is the wavelength of a central frequency of the ultrasonic signal in the medium and S is the side length of the transducer apparatus in a longitudinal sectional plane of the measurement tube, and said opening angle is defined by an amplitude drop of 20 decibels relative to a maximum amplitude.

In case of a reference arrangement as well as a measurement arrangement having more than one ultrasonic signal traverse in the measurement tube, the above applies, wherein the target difference is multiplied by a factor corresponding to a number of traverses.

Figure 2:
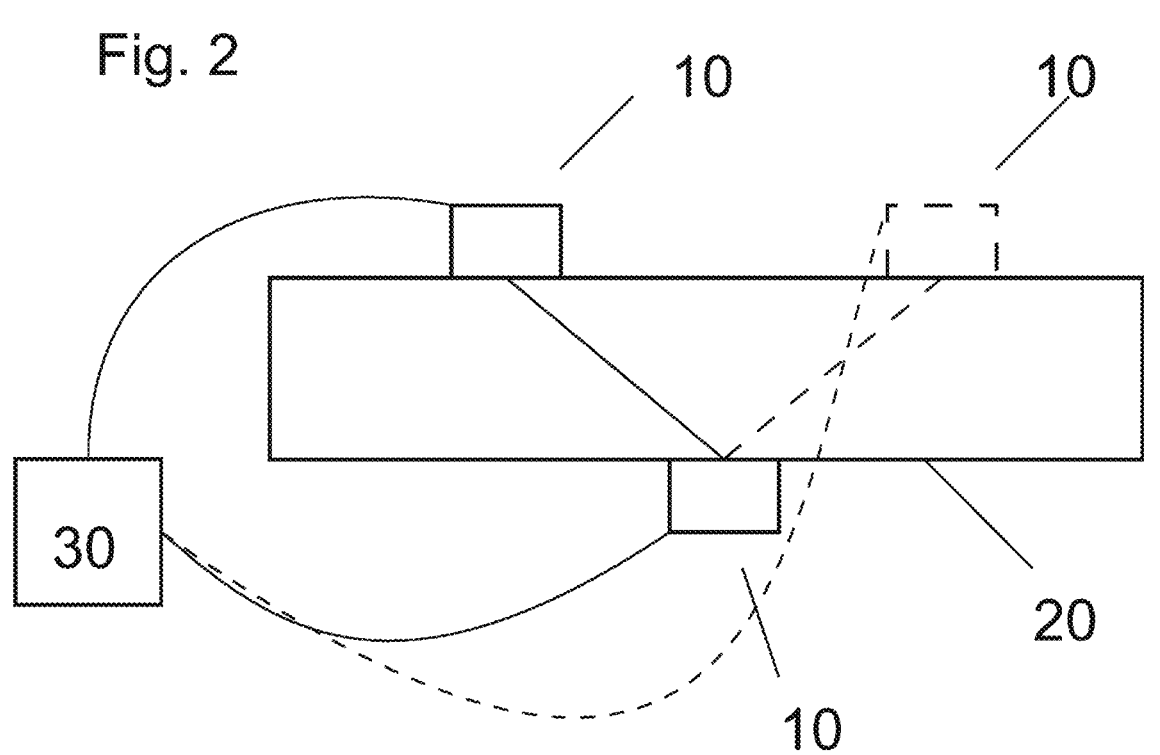
FIG. 2 illustrates an exemplary clamp-on ultrasonic measuring device.

FIG. 2 illustrates a schematic exemplary clamp-on ultrasonic measuring device having a measurement tube 20 and two ultrasonic transducers 10 in a single-traverse arrangement and in a double-traverse arrangement (dashed), respectively, and an electronic measuring/operating circuit 30 for operating the ultrasonic transducers and for providing and outputting measured values of a measurand. The measurand May be, for example, a sound velocity or a flow velocity or volume flow of a medium in the measurement tube. Clamp-on ultrasonic measuring devices having more than two traverses can also be used.

Figure 3:
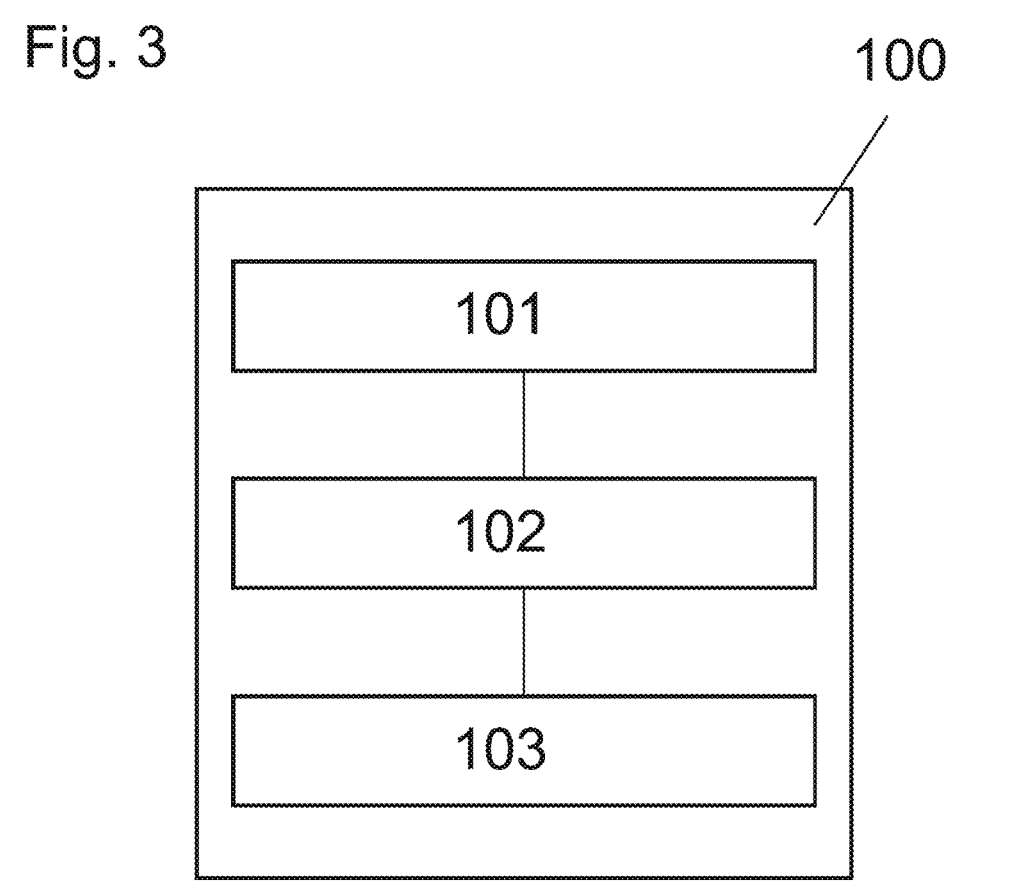
FIG. 3 illustrates an exemplary method according to the present disclosure for installing a clamp-on ultrasonic measuring device.

FIG. 3 illustrates a method 100 according to the invention for adjusting the clamp-on ultrasonic measuring device or the arrangement of the ultrasonic transducers on the measurement tube.

In a first method step 101 at least the following variables are used to determine the reference signal path or reference distance:

respectively at least one sound velocity of coupling body, measurement tube wall, medium, angle between first longitudinal axis and a normal to the measurement tube wall, a thickness of a measurement tube wall, a diameter of the measurement tube, number of ultrasonic signal traverses in the measurement tube.

The course of the reference signal path can thus be determined using Snell's law of refraction.

In a second method step 102, at least the opening angle in the medium is used to determine the reference difference, wherein in a third method step 103, the ultrasonic transducers of a pair are arranged on the measurement tube according to the results of the first method step and the second method step.

In one embodiment of the method, the electronic measuring/operating circuit 30 performs the first method step and the second method step and provides information to an operator in order to perform the third method step.

In one embodiment of the method, the operator provides the electronic measuring/operating circuit 30 with information required to perform the first method step. The information in this case is, for example, a typical sound velocity of the medium.

In this way, the measurement arrangement according to the invention can be configured in a simple and reliable manner.

The invention claimed is:

1. An arrangement of ultrasonic transducers of a clamp-on ultrasonic measuring device for measuring a measurand of a medium flowing through a measurement tube, the arrangement comprising:

at least one pair of ultrasonic transducers arranged on a tube wall of the measurement tube, the ultrasonic transducers configured to alternately transmit and receive ultrasonic signals, wherein the ultrasonic transducers, in a measurement arrangement, are at an axial arrangement distance from each other with respect to a measurement tube axis, wherein the ultrasonic transducers each include a transducer apparatus having a transducer longitudinal axis, the transducer apparatus configured to generate and detect ultrasonic signals, and a coupling body configured to transmit the ultrasonic signals between the transducer apparatus and the measurement tube, wherein each transducer apparatus is acoustically and mechanically connected to its associated coupling body via a transducer-side coupling surface of the coupling body, and wherein each transducer apparatus includes a side facing the coupling body, which side includes a contact surface region having a surface region centroid, wherein an emitting transducer apparatus is configured to generate an ultrasonic signal field, which ultrasonic signal field includes, in the coupling body, a first longitudinal axis parallel to the transducer longitudinal axis, wherein the ultrasonic signal field in the medium includes an opening angle in a measurement tube longitudinal section plane through the surface region centroids, wherein the first longitudinal axis defines a reference signal path of a reference arrangement for the ultrasonic transducers, is part of the reference signal path, and has a longitudinal axis angle to a normal of the tube wall, wherein the reference signal path defines an axial reference distance of the reference arrangement with respect to the surface region centroids of the ultrasonic transducers, wherein, in the measurement arrangement, a measurement path extends between the surface region centroids, wherein the axial arrangement distance is defined by the surface region centroids, wherein each coupling body is acoustically and mechanically connected to the measurement tube via a measurement tube-side coupling surface, wherein the axial arrangement distance is less than the axial reference distance, and a target difference between the axial reference distance and the axial arrangement distance is dependent on at least the opening angle of the ultrasonic signal field in the medium.

2. The arrangement according to claim 1,
wherein the opening angle in the medium is defined by an amplitude drop of 20 decibels relative to a maximum amplitude,
wherein the reference signal path in the medium has a first angle to the normal of the tube wall, wherein the measurement path in the medium has a second angle to the normal of the tube wall, wherein a magnitude of the second angle is smaller than the first angle,
wherein an angle difference between the first angle and the second angle is the opening angle multiplied by a factor of at most 1.5.

3. The arrangement according to claim 2, wherein the angle difference is the opening angle multiplied by a factor of at most 1.

4. The arrangement according to claim 1, wherein the target difference is at least 1 millimeter (mm).

5. The arrangement according to claim 4, wherein the target difference is at least 3 mm.

6. The arrangement according to claim 2, wherein the opening angle of the ultrasonic signal field is smaller than 2 times the first angle.

7. The arrangement according to claim 1,
wherein an ultrasonic signal causes echo paths in the tube wall which have a common end point with the reference signal path, and

wherein a receiving ultrasonic transducer in the measurement arrangement suppresses at least one first echo path on a side of the measurement tube facing the receiving ultrasonic transducer, the at least one first echo path having two reflections in the tube wall, and at least one second echo path having four reflections in the tube wall.

8. The arrangement according to claim 1, wherein each transducer apparatus includes at least one piezoelectric element.

9. The arrangement according to claim 1, wherein the opening angle in the medium is calculable by the following equation:

$$\ddot{O}=\arcsin(0.87*W/S),$$

where $\ddot{O}$ is the opening angle, W is a wavelength of a central frequency of the ultrasonic signal in the medium, and S is a side length of each transducer apparatus in a longitudinal sectional plane of the measurement tube.

10. A clamp-on ultrasonic measuring device for measuring a measurand of a medium in a measurement tube, the device comprising:
an arrangement according to claim 1; and
an electronic measuring/operating circuit configured to operate the ultrasonic transducers and to provide and output measured values of the measurand based on the detected ultrasonic signals.

11. A method for adjusting an ultrasonic measuring device according to claim 10, the method comprising:
determining the reference signal path or the axial reference distance using at least the following variables: at least one sound velocity of the coupling body, the tube wall, the medium, the longitudinal axis angle between the first longitudinal axis and the normal to the tube wall, a thickness of the tube wall, a diameter of the measurement tube, and a number of ultrasonic signal traverses in the measurement tube;
determining the target difference using at least the opening angle in the medium; and
arranging the ultrasonic transducers of the at least one pair of ultrasonic transducers on the measurement tube according to the determined the reference signal path or axial reference distance and the determined target difference.

12. The method according to claim 11, wherein the electronic measuring/operating circuit determines the target difference and the reference signal path or the axial reference distance and provides the determined the reference signal path or axial reference distance and the determined target difference to an operator to perform the arranging of the ultrasonic transducers.

13. The method according to claim 12, wherein the operator provides information to the electronic measuring/operating circuit to perform the determining of the reference signal path or the axial reference distance.

* * * * *